(12) United States Patent
Maryamchik et al.

(10) Patent No.: US 7,282,087 B2
(45) Date of Patent: Oct. 16, 2007

(54) WETTED PARTICLE AND DROPLET IMPINGEMENT SURFACE

(75) Inventors: Mikhail Maryamchik, Copley Township, Summit County, OH (US); David J. Walker, Wadsworth, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 292 days.

(21) Appl. No.: 10/948,478

(22) Filed: Sep. 23, 2004

(65) Prior Publication Data

US 2006/0060088 A1    Mar. 23, 2006

(51) Int. Cl.
*B01D 53/78* (2006.01)
*B01D 47/06* (2006.01)
(52) U.S. Cl. .......................................... 96/291; 96/355
(58) Field of Classification Search ................... 96/355, 96/361, 291, 300; 55/434; 95/215; 422/139, 422/145, 177, 211, 213, 214
See application file for complete search history.

(56) References Cited

U.S. PATENT DOCUMENTS

| | | | | | |
|---|---|---|---|---|---|
| 2,523,441 | A | * | 9/1950 | McKamy | 96/273 |
| 2,691,423 | A | * | 10/1954 | McIlvaine | 96/335 |
| 3,168,596 | A | * | 2/1965 | Jamison | 261/89 |
| 3,727,381 | A | * | 4/1973 | Kreimann | 96/291 |
| 3,768,234 | A | * | 10/1973 | Hardison | 96/253 |
| 3,907,527 | A | * | 9/1975 | Onnen | 96/244 |
| 3,987,148 | A | * | 10/1976 | Squires | 423/243.08 |
| 4,166,730 | A | * | 9/1979 | Warhol | 96/267 |
| 4,533,367 | A | * | 8/1985 | Hadzismajlovic | 95/211 |
| 4,888,158 | A | * | 12/1989 | Downs | 423/243.04 |
| 5,180,406 | A | * | 1/1993 | Shih | 96/262 |

FOREIGN PATENT DOCUMENTS

KR      2004011832 A    *   2/2004

* cited by examiner

*Primary Examiner*—Frank M. Lawrence
(74) *Attorney, Agent, or Firm*—Eric Marich; Michael J. Seymour

(57) ABSTRACT

An inert impingement surface that is pliable and which, when set in motion, works to shed itself of particle deposits. The pliable surface may be formed of a plurality of coactive members that co-operate with one another to clean-off the particle deposits from each other's surfaces. The coactive members may be in the form of chains, rods, cables, wires, granular inert materials such as gravel or metal balls or other impact means. The pliable surface may also be formed of a heat-resistant material which is caused to experience a continuing shape change, thereby casting-off the particle deposits adhering to the surface.

41 Claims, 5 Drawing Sheets

WETTED PARTICLE AND DROPLET IMPINGEMENT SURFACE

BACKGROUND OF THE INVENTION

1. Field of the Invention

The present invention relates to flue gas desulfurization, and more particularly to an impingement surface for the removal of wetted particles or droplets from a flue gas stream.

2. Description of the Related Art

The desulfurization of flue gas, particularly flue gas from power plants, has been the subject of considerable study. Air quality laws, both at the federal and state level, have set increasingly stringent emission standards especially for such known pollutants as sulfur oxides. The sulfur oxides, principally present as sulfur dioxide, are found in the flue gases discharged by coal and oil-fired electric power generating plants, refuse-to-energy plants, and the waste gases from other industrial processes. In addition, sulfur-containing gases, notably sulfur dioxide, may be formed in the partial combustion or gasification of sulfur containing fuels, such as coal or petroleum residuals. The control of air pollution resulting from the discharge of sulfur dioxide into the atmosphere has thus become increasingly urgent.

Sulfur oxides are produced in significant quantity by the combustion of coal or fuel oil, and a popular choice for utilities burning low sulfur fuels, for smaller industrial processes, and for refuse-to-energy plants for purposes of removing sulfur dioxide from flue gases has been the dry scrubber because of its relatively lower capital costs and its simplicity of operation. In dry scrubbing, sometimes referred to as spray drying or spray absorption, an aqueous alkaline solution or slurry is finely atomized via a mechanical, dual fluid, or rotary type atomizer and sprayed into hot flue gas to remove sulfur oxides and other contaminants. Another technical solution to reduce the emission of sulfur oxides during the production of steam for industrial uses or utility power generation is the circulating fluidized bed (CFB) reactor or combustor. In fluidized bed combustion, combustion takes place in a mixture of particles including the combustible material and limestone or dolomite which is suspended in an upwardly flowing gas stream within a furnace. The process is characterized by high heat transfer rates in the furnace, but with low combustion temperatures. The limestone undergoes a chemical reaction known as calcination within the furnace, forming calcium oxide (CaO), a sorbent which reacts with the sulfur oxides in the gas to form calcium sulfate $CaSO_4$. $CaSO_4$ is then removed from the system as a solid for disposal. In the CFB process, a circulating inventory of solids circulates throughout the furnace and heat transfer portions and since not all of the CaO particles react with the sulfur oxides in the gas, unreacted sorbent is carried along with the flue gas exiting from the CFB reactor.

Because of equipment space and cost limitations, the size of the dry scrubber may be such that the distance between the fluid atomizers and the absorber chamber outlet does not provide sufficient gas residence or retention time in the chamber to evaporate all of the droplets and the liquid from the wetted particles. This dry scrubber size limitation raises the likelihood of wetted particles and droplets hitting the wall of the absorber chamber and causing deposits to adhere to the internal surface of the chamber and such deposits may accumulate and interfere with the proper operation of the dry scrubber and necessitate a shutdown of the equipment to allow for a clean out of the absorber chamber internal walls.

The prior art, as disclosed in U.S. Pat. No. 4,888,158 to Downs, sought to overcome this problem by introducing an inert impingement surface in the absorber chamber designed to remove only the unevaporated droplets and wetted particles from the gas stream while allowing the dry particles to pass to the particulate collection device. A shortcoming of this prior art inert impingement device is its rigid one-piece construction, which has made it difficult to remove the dried particle deposits from its surface, notwithstanding the use of rappers, sootblowers and mechanical scrappers.

SUMMARY OF THE INVENTION

The aforementioned prior problem is overcome, to a large extent, through the practice of the present invention which provides an inert impingement surface that is pliable and which, when set in motion, works to shed itself of dried particle deposits. In its broadest aspect, the present invention is drawn to an apparatus for conducting a gas-liquid reaction on the surface of wetted particles and/or droplets contained in a gas flowing therethrough.

In accordance with the invention, the pliable surface may be formed of a plurality of coactive members that co-operate with one another to clean-off the dried particle deposits from each other's surfaces. It has been found that solid objects which bounce-off one another cause a wiping effect and, thus, prevent caking or hardening of dried particle deposits formed on their surfaces. This impact mechanical action provides a self-cleaning arrangement. While the coactive members, which co-operate to form the pliable surface, may be in the form of chains, rods, cables, wires, granular inert materials such as gravel or metal balls, etc., or other impact means, hereinafter the invention will be described specifically with reference to chains and granular inert materials for simplicity. However, it should be understood that the use of such description is for the sake of conciseness and readability and is in no way intended to limit the scope of the invention to the coactive members herein described. The pliable surface may also be formed of a heat resistant material which is caused to experience a continuing shape change, thereby casting-off the dried particle deposits adhering to the surface.

In one embodiment of the invention, the pliable surface is made up of coactive members comprising a series of metal links or rings connected to or fitted into one another so as to move freely and, thus, form the pliable or flexible surface, for example, a chain. In this embodiment, the pliable surface is preferably formed from a series of such chains suspended side by side from a support structure so as to hang in the absorber chamber. Conventional rappers or other devices are provided so as to cause the chains to move and hit each other and, thus, clean-off the dried particle deposits.

In another embodiment of the invention, the pliable surface is made up of coactive members comprised of granular inert material which forms a bed supported by a perforated plate. The bed is set in motion by a rotating paddle agitator causing the coactive members to move about and collide or bounce-off each other and, thus, clean-off the dried particle deposits. A conventional mechanical or pneumatic conveyor may recirculate the coactive members to a predetermined level above the bed and cause the recirculated coactive members to cascade through the gas stream and onto the bed. In this embodiment, the bed and the cascading coactive members form the pliable surface.

In still another embodiment of the invention, the pliable surface is made up of coactive members comprised of granular inert material which forms a bed agitated by a rotating paddle agitator. The bed is set in motion by a hollow drive shaft causing the coactive members to move about and collide or bounce-off each other and, thus, clean-off the dried particle deposits. The drive shaft projects above the bed, and has an opening at the lower portion of the bed. A conventional rotary screw conveyor extends coaxially through the shaft to pick-up the coactive members at the shaft opening and recirculate them to a predetermined level above the bed and cause the recirculated coactive members to cascade through the gas stream onto the bed. In this embodiment, the moving bed and the cascading coactive members form the pliable surface.

In a further embodiment of the invention, the pliable surface is made up of cascading coactive members comprised of granular inert material moving about and colliding as they cascade through the gas stream. A gaseous medium sweeps the dried particle deposits off the cascaded coactive members, and the latter are then recirculated to the spray drier at a predetermined level above the gas outlet.

In still a further embodiment of the invention, the pliable surface is made up of a flexible heat resistant material preferably structured as a hollow cylinder in its undeformed state. Biasing rollers engage either the outer surface, or the inner surface, or both surfaces of the hollow cylinder and rotate around its circumference while forcing a continuing shape change to deform it into a shape similar to a frustum of a cone which causes the dried particle deposits to fall-off the surface thereof. A rotating paddle agitator is positioned within a bed of granular inert material, particles of which move about the bed and collide with one another and, thus, clean-off the dried particle deposits. In this embodiment the flexible surface and the moving bed form the pliable surface.

The common thread, in each of the above embodiments of the invention, is that the surface which is impinged by the liquid droplets and the wetted particles is pliable or flexible and therefore changeable and, thus, facilitates the removal of dried particle deposits from the surface. Preferably, the surface is a dedicated surface which is located at the gas outlet, upstream of any other surface facing a flow of wetted particles and/or droplets.

The various features of novelty which characterize the invention are pointed out with particularity in the claims annexed to and forming part of this disclosure. For a better understanding of the present invention, and the operating advantages attained by its use, reference is made to the accompanying drawings and descriptive matter in which preferred embodiments of the invention are illustrated.

DESCRIPTION OF THE PREFERRED EMBODIMENTS

Figure 1:
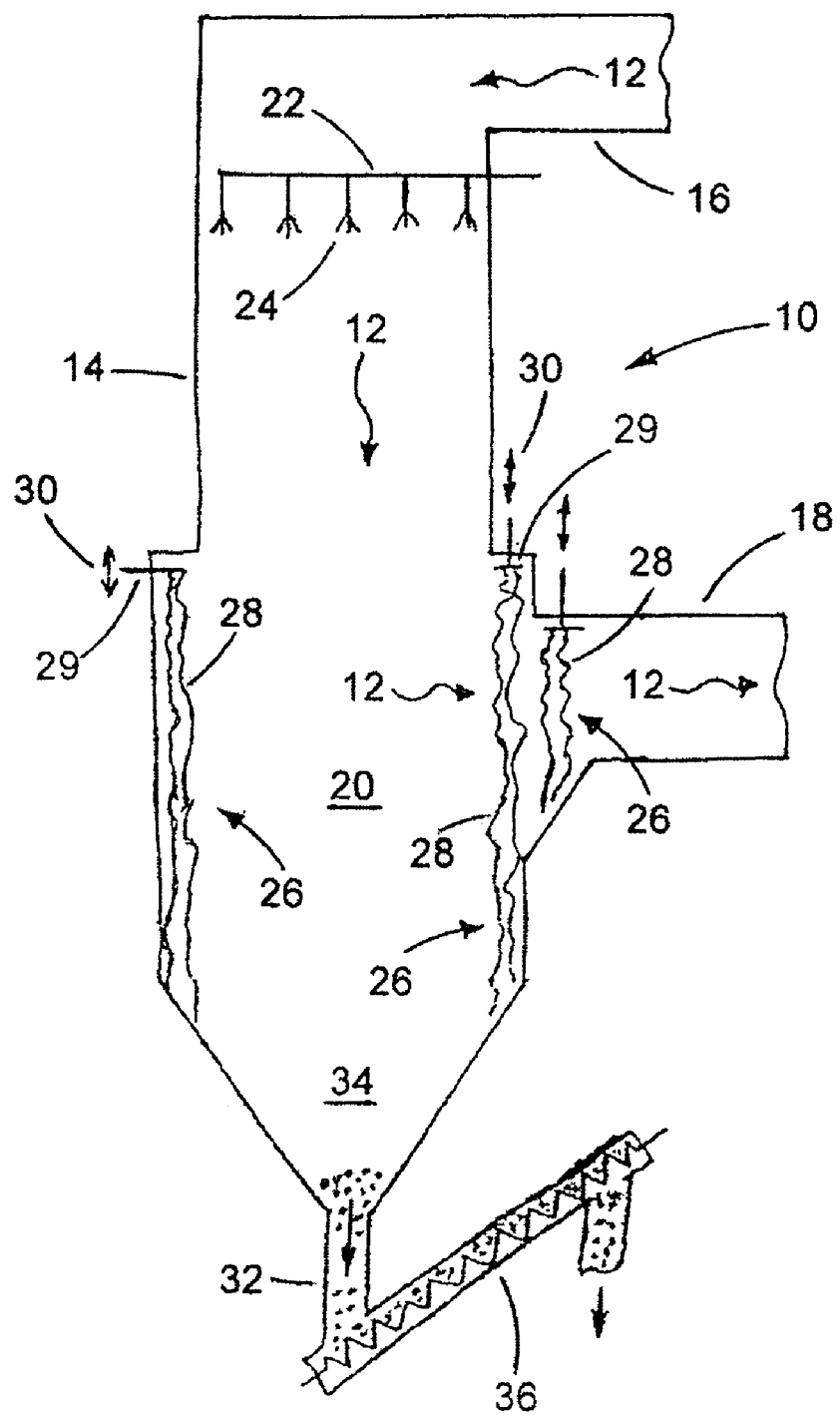
FIG. 1 is a schematic sectional side view of a spray absorber in accordance with one embodiment which incorporates the present invention.

The present invention has application to spray absorbers which are widely used in power, chemical and other industries, and is not limited to the illustrated embodiments. It is to be understood that, in these embodiments, the dimensions, shapes and relative arrangements of the various components are given solely to illustrate the present invention and not to limit the scope thereof.

Reference will hereinafter be made to the accompanying drawings wherein like reference numerals throughout the various figures denote like elements.

Referring to the embodiments in FIGS. 1 through 5 of the drawings, there is shown a vertical co-current down flow dry scrubber module 10 including a shell 14, a flue gas inlet 16, a flue gas outlet 18, and a chamber 20 situated therebetween. Generally, a hot flue gas stream 12 enters the dry scrubber module 10 through the inlet 16 and past one or more fluid atomizers 22, located at the upper end of the absorber chamber 20, for spraying a wetting liquid 24 into the flue gas. The wetting liquid 24 may comprise a finely atomized alkali solution or slurry reagent which is dispersed into the flue gas stream 12 to absorb sulfur oxides and other contaminants entrained in the flue gas stream 12. Alternatively, the wetting liquid 24 may comprise only water which is being sprayed into the flue gas stream 12, since it is understood that the particulates which may be contained within the flue gas 12 can comprise unreacted sulfur sorbents which are present in sufficient quantity and with sufficient alkalinity which will react with the water and absorb sulfur oxides from the flue gas stream 12. These particulates may be contained within the flue gas stream 12 due to the fact that the flue gas stream 12 may be the exhaust flue gas from a circulating fluidized bed (CFB) reactor (not shown) which still contains a significant amount of solids particles and unreacted sorbent (e.g., CaO particles). The treated flue gas stream 12 continues to travel downwardly and eventually exits the absorber chamber 20 through the outlet 18, and at a right angle with respect to the downward direction of flow within the chamber 20. After exiting through the outlet 18, the flue gas stream 12 is directed to a particulate collection device (not shown) such as a baghouse or an electrostatic precipitator. It is understood that a baghouse may be generally preferred over an electrostatic precipitator because there can be further sulfur absorption taking place between the filter cake which deposits upon the surfaces of the bag filters and the flue gas stream 12 being passed therethrough.

Refer now to the embodiment of the invention shown at FIG. 1 and, in particular, the lower portion of the shell 14 which includes a hopper 34 located at the bottom of the absorber chamber 20. In this embodiment of the invention, the pliable wetted particle and droplet impingement surface 26 is comprised of coactive members 28, schematically shown, and preferably intended to be in the form of metal links or rings connected to or fitted into one another to constitute a chain. However, it should be understood that rods, cables, wires, and the like, are suitable substitutes provided they are free to move and, thus, able to form a pliable surface. A series of chains are suspended side by side from a support structure 29, and conventional rappers or other devices (not shown), are connected to the support structure 29 to cause the chains to move, as schematically shown at arrows 30, and hit each other and, thus, clean-off the dried particle deposits impinged thereon by the passing flue gas stream 12. Although the direction of movement 30 is schematically shown in FIG. 1 as being up-and-down, persons skilled in the art will appreciate that any type or direction of motion of the coactive members 28 which will cause particles adhering thereto to be dislodged, may be employed. The coactive members may be moved towards or away from (relative to) the support structure 29, or towards or away from (relative to) each other. The degree of motion may be selected to cause the coactive members 28 to strike the support structure 29, or each other, or both. Some of the coactive members 28 may be held stationary while other coactive members 28 are moved relative thereto, or by a combination of the aforementioned approaches. Similarly, the coactive members 28 may be mounted on eccentric cams to cause them to move in a manner which would shake them and dislodge particles adhering to the members 28, such as by side-to-side motion and striking adjacent members 28, or by striking the support structure 29, or both. If desired, a rotating paddle agitator means as described in connection with several of the following embodiments disclosed in the present specification may be employed, the paddles of the agitator striking the coactive members 28 to dislodge adhering particles therefrom. The dry deposits which are removed from the coactive members 28 forming the pliable surface 26 are collected in the hopper 34 and discharged through the hopper outlet 32 to a conventional rotary screw conveyor 36 to be transported to an alkaline slurry preparation facility or to a landfill. Preferably the dedicated surface is located at the gas outlet, upstream of any other surface facing a flow of wetted particles and/or droplets. This feature can be accomplished by suitable design and/or location of the one or more fluid atomizers 22, located at the upper end of the absorber chamber 20, for spraying the wetting liquid 24 into the flue gas.

Figure 2:
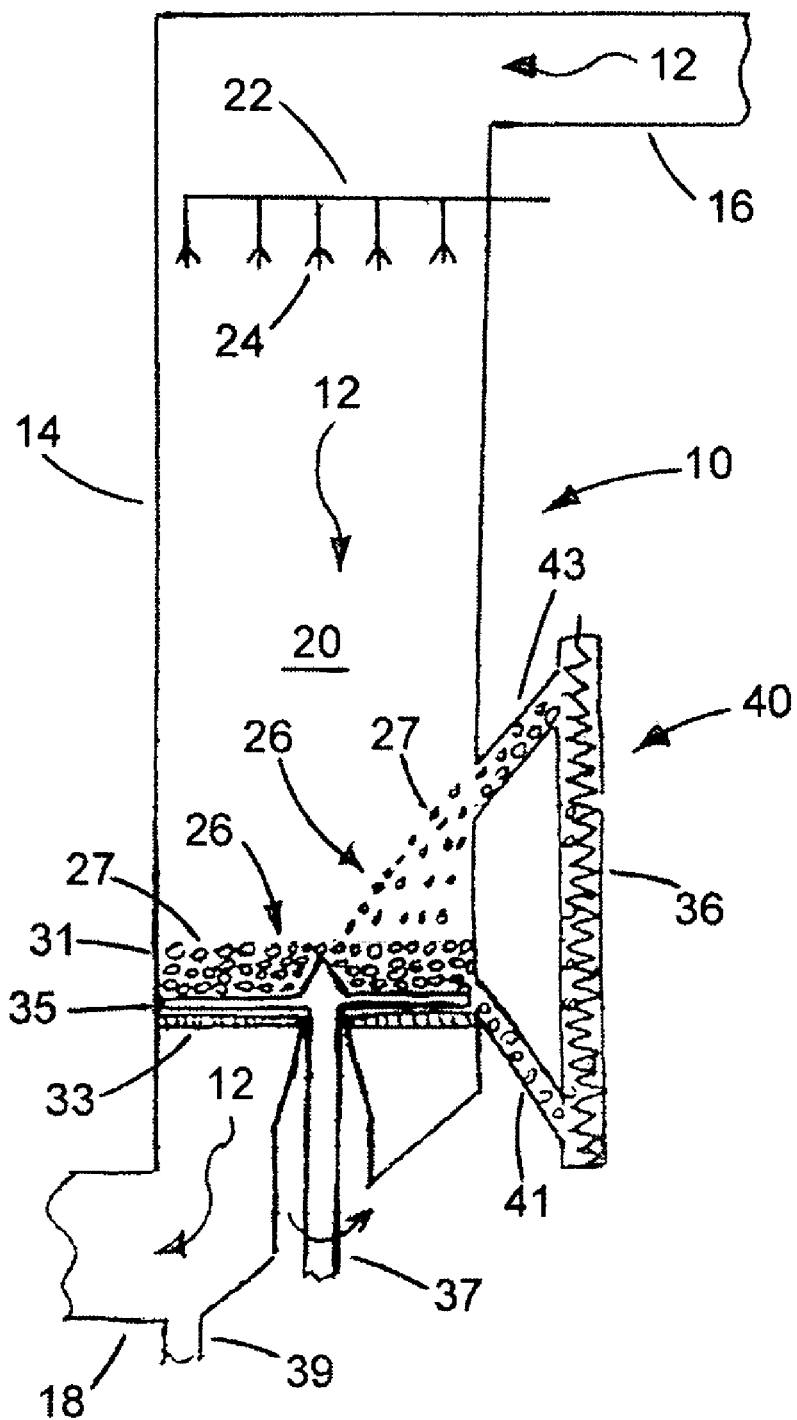
FIG. 2 is a schematic sectional side view of a spray absorber in accordance with another embodiment which incorporates the present invention.

Refer now to the embodiment shown in FIG. 2 and, in particular, the components that are associated with the pliable wetted particle and droplet impingement surface 26. In this embodiment, surface 26 is made up of coactive members 27 that are comprised of granular inert material and forming a bed 31 supported by a grid 33, the latter having openings which are sized to be smaller than the coactive members 27 and, thus, preventing them from passing therethrough. The bed 31 is set in motion by a rotating paddle agitator 35 which causes the coactive members 27, i.e., the granular inert material, to move about and collide or bounce-off each other, thereby wiping or cleaning-off the dried particle deposits resulting from the wetted particles and droplets impinged thereon by the passing flue gas stream 12. A drive shaft 37 is secured to the paddle agitator 35 to impart rotation thereto. The dried particle deposits which have been cast-off or removed from the coactive members 27 are carried-off by the flue gas stream 12 as it passes through the bed 31 and are then conveyed through the gas outlet 18 to a baghouse or electrostatic precipitator (not shown). A clean-out pipe 39 is provided at the bottom of chamber 20 for the removal of dried particle deposits and other particles which may have precipitated out of the gas stream 12 exiting the chamber 20. This embodiment of the invention includes a system 40 for recirculating the coactive members 27 which have shed the dried particle deposits. The system 40 includes a conduit 41 which delivers the coactive members 27 to a conventional rotary screw conveyor 36 which recirculates or transports the coactive members 27 to a predetermined level above the rotating bed 31, and discharges them through a conduit 43 into the chamber 20 thereby causing the coactive members 27 to cascade through the flue gas stream 12 and onto the agitated bed 31 while being impinged by wetted particles and droplets from the flue gas stream 12. In accordance with this embodiment of the invention, the coactive members 27 moving about the agitated bed 31 and cascading through the flue gas stream 12 form the pliable surface 26.

Figure 3:
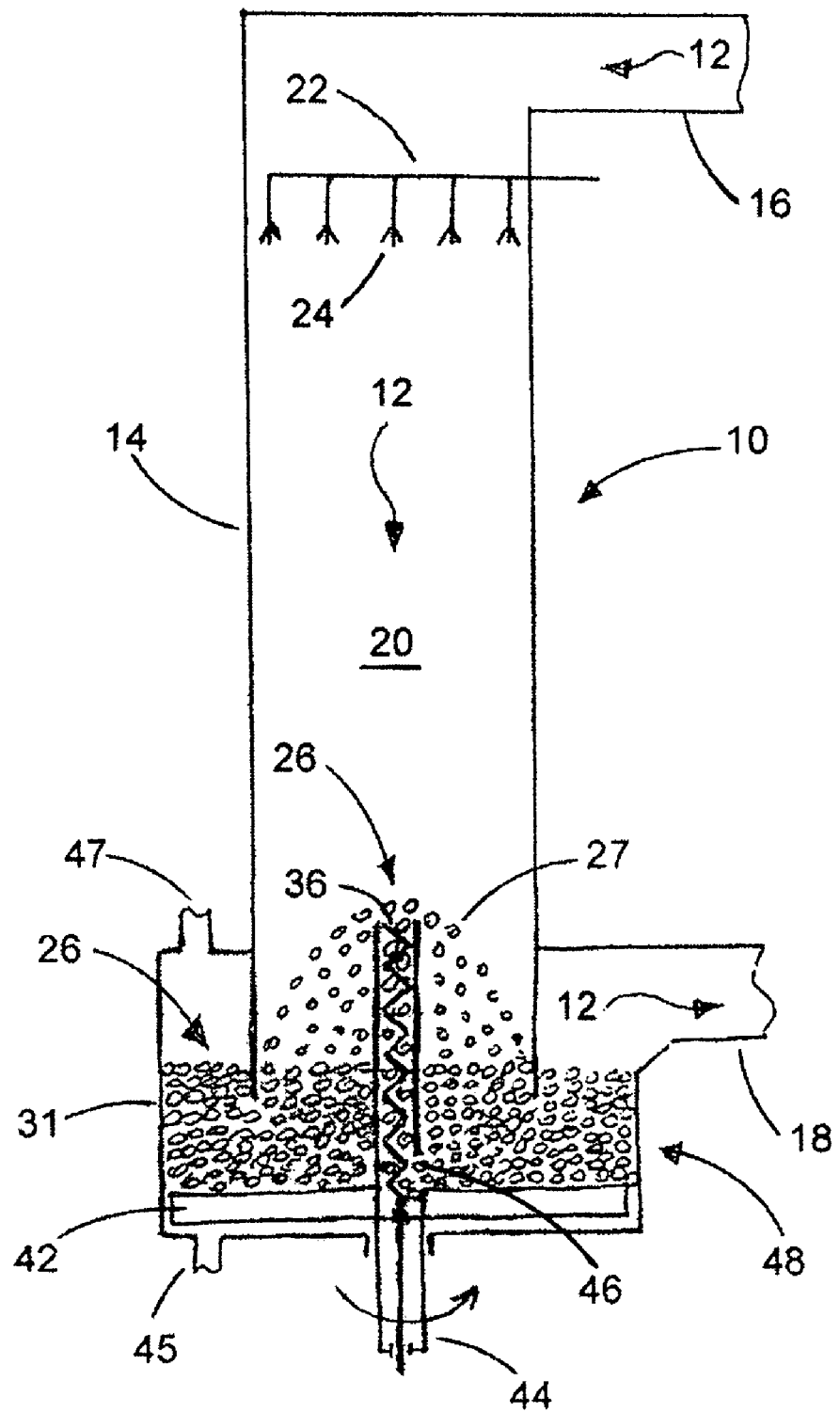
FIG. 3 is a schematic sectional side view of a spray absorber in accordance with still another embodiment which incorporates the present invention.

Refer now to the embodiment covered by FIG. 3 and, in particular, the components that are associated with the pliable wetted particle and droplet impingement surface 26 which, in this embodiment, is made up of coactive members 27 that are comprised of granular inert material and forming a bed 31 which is agitated by a rotating paddle agitator 42. A drive shaft 44 is secured to the agitator 42 to impart rotation thereto. A portion of the drive shaft 44 is hollow and projects coaxially to a predetermined level through and above the agitator 42 and the bed 31, and is formed with an opening 46 located at the elevation of the rotating paddle agitator 42 near the bottom of the bed 31. The bed 31 is set in motion by the rotating paddle agitator 42 which causes the granular inert material that makes up the coactive members 27 to move about and collide or bounce-off each other, thereby wiping-off the dried particle deposits resulting from the wetted particles and droplets impinged thereon by the passing flue gas stream 12. The dried particle deposits which have been cast-off or removed from the coactive members 27 are carried-off by the flue gas stream 12 as it passes through and across the moving bed 31, and are then conveyed through the gas outlet 18 to a baghouse or electrostatic precipitator (not shown). A clean-out pipe 45 is provided underneath the bed 31 for the removal of dried particle deposits and other particles which may have precipitated out of the flue gas stream 12 exiting the chamber 20, or for removing, when necessary, coactive members 27 from the bed 31. A supply pipe 47 is provided above the bed 31 for the addition, when necessary, of coactive members 27 to the bed 31. This embodiment includes a system 48 for recirculating the coactive members 27 which have shed the dried particle deposits. The system 48 includes a conventional rotary screw conveyor 36 which extends up through the hollow drive shaft 44. The conveyor 36 picks-up coactive members 27 from the bed 31 through a shaft opening 46 and recirculates or transports the coactive members 27 to the top of the drive shaft 44 where they are discharged and caused to cascade through the flue gas stream 12 onto the moving bed 31 while being impinged by wetted particles and droplets from the flue gas stream 12. In accordance with this embodiment of the invention, the coactive members 27 moving about the agitated bed 31 and cascading through the flue gas stream 12 form the pliable surface 26.

Figure 4:
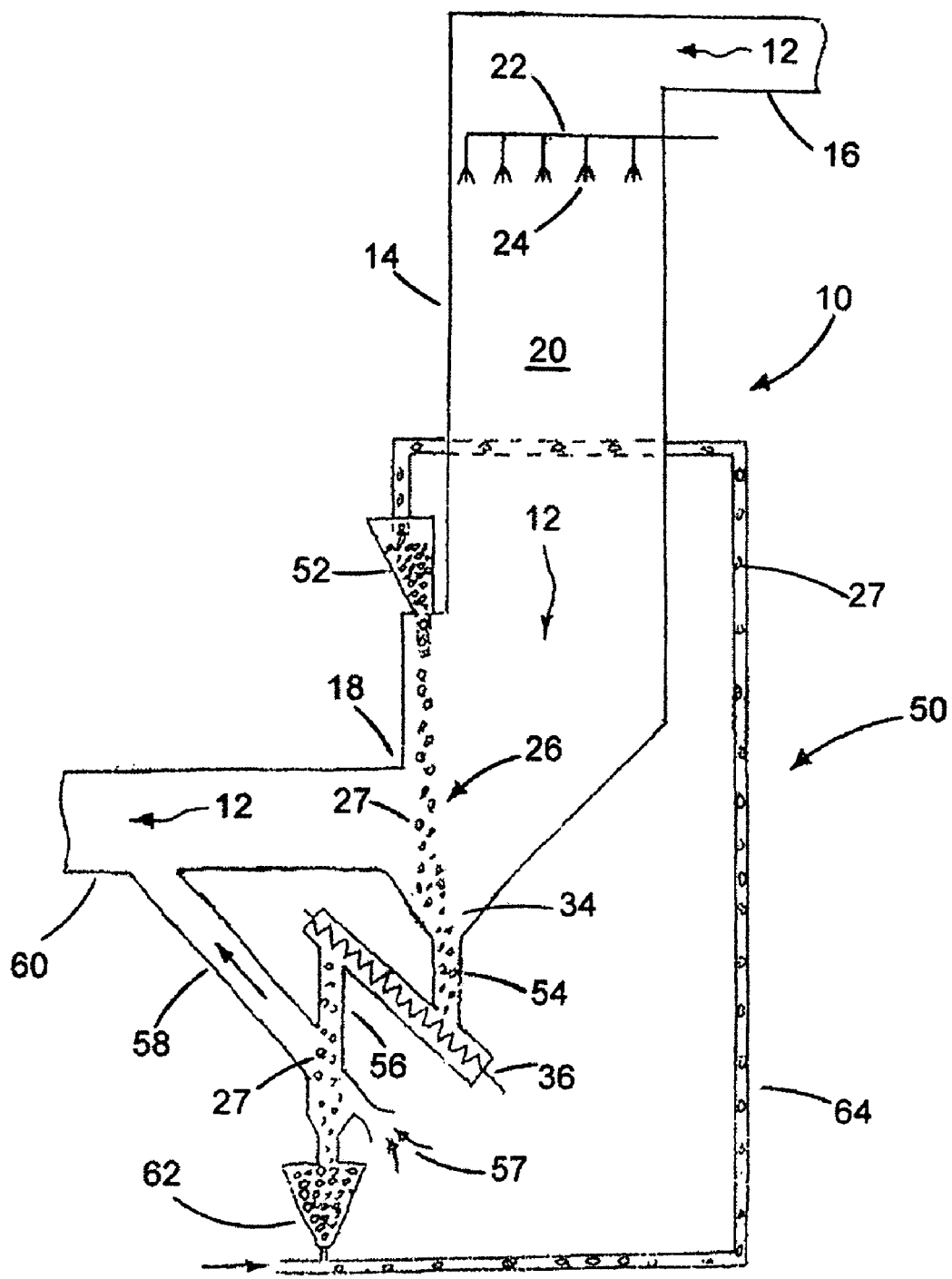
FIG. 4 is a schematic sectional side view of a spray absorber in accordance with a further embodiment which incorporates the present invention.

Refer now to the embodiment covered by FIG. 4 and, in particular, the components that are associated with the pliable wetted particle and droplet impingement surface 26 which, in this embodiment, is made up of coactive members 27 that are comprised of granular inert material. This embodiment of the invention includes a system 50 for recirculating the coactive members 27 which have shed the dried particle deposits. The system 50 includes a chute 52 located above the gas outlet 18 for discharging the coactive members 27 and, thus, causing them to cascade through the flue gas stream 12 and into the hopper 34 while being impinged by wetted particles and droplets from the flue gas stream 12. The cascaded coactive members 27 are discharged from the hopper 34 through a conduit 54 onto a conventional rotary screw conveyor 36, and the latter discharges the coactive members 27 into a conduit 56 which intersects a conduit 58. A gaseous medium 57 is caused to flow through the conduit 58, either by suction resulting from the negative pressure in the gas outlet duct 60 or by an external pressure source (not shown). The gaseous medium 57 flows across the intersecting coactive members 27 and sweeps-off the dried particle deposits which are then discharged into the flue gas stream 12 for collection in the baghouse or the electrostatic precipitator (not shown). The swept coactive members 27 are discharged into a hopper 62 to be picked-up by pneumatic conveyor 64 and recycled to the chute 52. In accordance with this embodiment of the invention, the coactive members cascading through the flue gas stream 12 and intersecting the gaseous medium 57 form the pliable surface 26.

Figure 5:
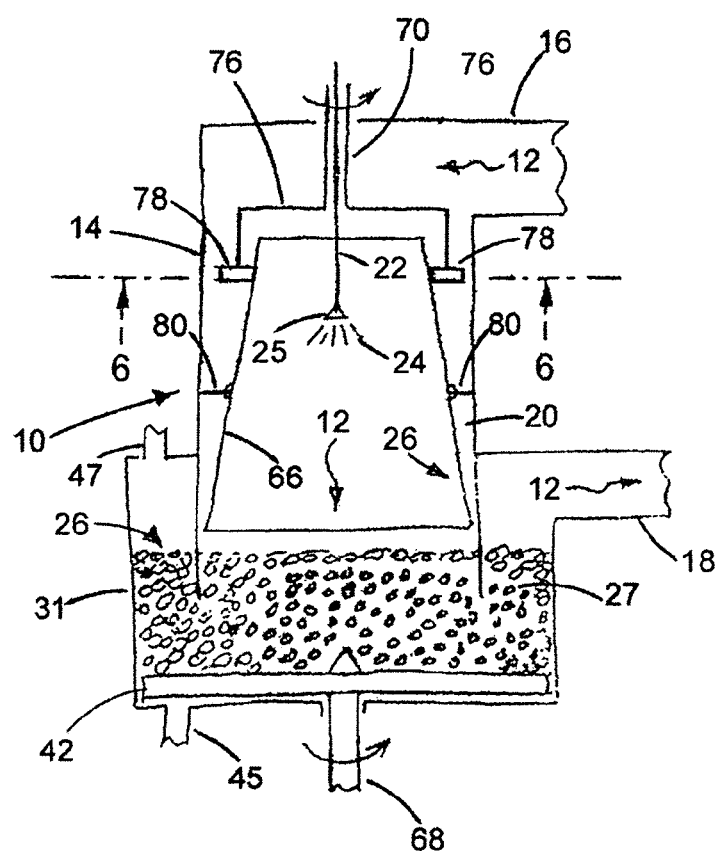
FIG. 5 is a schematic sectional side view of a spray absorber in accordance with yet another embodiment which incorporates the present invention.

Turning now to the embodiment covered by FIG. 5 and, in particular, the components that are associated with the pliable wetted particle and droplet impingement surface 26 which, in this embodiment, includes a heat resistant material preferably structured as a flexible or pliable hollow cylinder 66, in its undeformed state, and located in the chamber 20. A hollow drive shaft 70 projects through the chamber 20, and has an atomizer in the form of pipe 22 extending through it and terminating in a nozzle 25 for spraying a finely atomized alkali solution, slurry reagent, or simply water 24 into the flue gas stream 12 to absorb sulfur oxides and other contaminants entrained in the flue gas stream 12. As described earlier, when water 24 is sprayed into the flue gas stream 12, solids or particulates which may be contained within the flue gas 12 comprising unreacted sulfur sorbents having sufficient alkalinity will react with the water and absorb sulfur oxides. These particulates may be contained within the flue gas 12 due to the fact that the flue gas 12 may be the exhaust flue gas from a circulating fluidized bed (CFB) reactor (not shown) which still contains a significant amount of solids particles and unreacted sorbent (e.g., limestone particles). The drive shaft 70 is provided with at least a pair of diametrically opposed radial arms 76, each of which supports a biasing roller 78 engaging the pliable hollow cylinder 66. The length of each of the radial arms 76 is sized to cause the rollers 78 to bias or force the engaged section of the flexible hollow cylinder 66 inwardly into a frustum shape. The rotating drive shaft 70 causes the biasing rollers 78 to rotatably move about the circumference of the pliable hollow cylinder 66 thereby forcing it to experience a continuing shape change and, thus, causing the dried particle deposits to fall-off the surface of the frustum 66. Although FIG. 5 illustrates externally engaging biasing rollers 78, and the flexible structure 66 in its deformed state, it is understood that rollers 78 may engage either the outer surface, or the inner surface, or both surfaces of the hollow cylinder 66 rotate around its circumference while forcing a continuing shape change to deform it into a shape similar to a frustum of a cone which causes the dried particle deposits to fall-off the surface thereof. The frustum 66 is supported from the shell 14 by link structures 80 which are designed to support and locate the cylinder 66 during its continuing shape change into a frustum 66 caused by the rollers 78. A bed 31 of coactive members 27 is located below the frustum 66 and may again be agitated by a rotating paddle agitator 42 which is secured to a drive shaft 68 to impart rotation thereto. The bed 31 is set in motion or agitated by the rotating paddle agitator 42 which causes the granular inert material that make up the coactive members 27 to move about and collide or bounce-off each other, thereby wiping-off the dried particle deposits resulting from the wetted particles and droplets impinged thereon by the passing flue gas stream 12. The dried particle deposits, which have been cast off by the frustum 66 and by the coactive members 27, are carried-off by the flue gas stream 12 as it passes through the frustum 66 and through and across the moving bed 31, and are then conveyed through the gas outlet 18 to a baghouse or electrostatic precipitator (not shown). A clean-out pipe 45 is provided underneath the bed 31 for the removal of dried particle deposits and other particles which may have precipitated out of the gas stream 12 exiting the chamber 20, or for removing, when necessary, coactive members 27 from the bed 31. A supply pipe 47 is provided above the bed 31 for the addition, when necessary, of coactive members 27 to the bed 31. In accordance with this embodiment of the invention, the frustum 66 and the coactive members 27 moving about the agitated bed 31 form the pliable surface 26.

Figure 6:
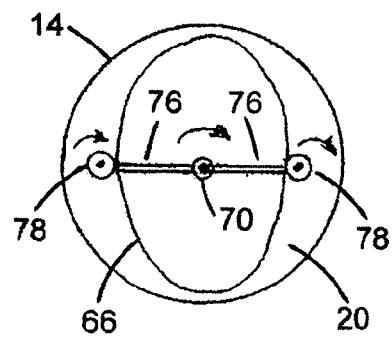
FIG. 6 is a schematic cross-sectional view taken along line 6-6 of FIG. 5.

Referring now to FIG. 6, there is shown the shell 14 enclosing the chamber 20 which houses the hollow pliable frustum 66. The drive shaft 70 includes the diametrically opposed radial arms 76 which support the biasing rollers 78. The pliable hollow frustum 66 is forced to continuously change shape to a generally elliptical cross-section as the biasing rollers 78 are rotatably driven about the circumference of the frustum 66 by the drive shaft 70.

Although the present invention has been described above with reference to particular means, materials and embodiments, it is to be understood that this invention may be varied in many ways without departing from the spirit and scope thereof, and therefore is not limited to these disclosed particulars but extends instead to all equivalents within the scope of the following claims.

We claim:

1. An apparatus for conducting a gas-liquid reaction on the surface of wetted particles and/or droplets contained in a gas flowing therethrough, comprising:
    shell means having a gas inlet and a gas outlet and defining a chamber therebetween;
    means for spraying a wetting liquid into the gas;
    a dedicated surface for impingement of wetted particles and fluid droplets entrained in the gas, the dedicated surface being located in the gas path within the chamber;
    at least a portion of the dedicated surface being pliable and located downstream of the fluid spraying means;
    means for setting the pliable portion of the dedicated surface in motion for the removal of impinged particles therefrom, wherein the dedicated surface is top supported and a rotating paddle agitator sets the pliable portion in motion.

2. An apparatus for conducting a gas-liquid reaction on the surface of wetted particles and/or droplets contained in a gas flowing therethrough, comprising:
    shell means having a gas inlet and a gas outlet and defining a chamber therebetween;
    means for spraying a wetting liquid into the gas;
    a dedicated surface for impingement of wetted particles and fluid droplets entrained in the gas, the dedicated surface being located in the gas path within the chamber;
    at least a portion of the dedicated surface being pliable and located downstream of the fluid spraying means;
    means for setting the pliable portion of the dedicated surface in motion for the removal of impinged particles therefrom, wherein the pliable portion of the dedicated surface is formed of a plurality of coactive members and a rotating paddle agitator sets the coactive members in motion.

3. The apparatus according to claim 2, wherein the coactive members are granular inert materials.

4. An apparatus for conducting a gas-liquid reaction on the surface of wetted particles and/or droplets contained in a gas flowing therethrough, comprising;

shell means having a gas inlet and a gas outlet and defining a chamber therebetween;

means for spraying a wetting liquid into the gas;

a dedicated surface for impingement of wetted articles and fluid droplets entrained in the gas, the dedicated surface being located in the gas path within the chamber;

at least a portion of the dedicated surface being pliable and located downstream of the fluid spraying means;

means for setting the pliable portion of the dedicated surface in motion for the removal of impinged particles therefrom, wherein the pliable portion of the dedicated surface is formed of a plurality of coactive members and the coactive members are ball-shaped metallic bodies.

5. The apparatus according to claim 2, wherein the coactive members are flexibly linked to one another.

6. An apparatus for conducting a gas-liquid reaction on the surface of wetted particles and/or droplets contained in a gas flowing therethrough, comprising:

shell means having a gas inlet and a gas outlet and defining a chamber therebetween;

means for spraying a wetting liquid into the gas;

a dedicated surface for impingement of wetted particles and droplets entrained in the gas, the dedicated surface being located in the gas path within the chamber;

at least a portion of the dedicated surface being pliable and located downstream of the fluid spraying means;

means for setting the pliable portion of the dedicated surface in motion for the removal of impinged particles therefrom;

a hopper located at the bottom of the chamber for collecting at least some of the shed particles, wherein the means for removing the shed particles from the hopper includes a rotary screw conveyor.

7. The apparatus according to claim 4 wherein a rotating paddle agitator sets the coactive members in motion.

8. The apparatus according to claims 2, 3, 5, or 7 including a horizontally disposed grid positioned underneath the agitator.

9. The apparatus according to claim 8, wherein the grid is perforated with openings sized to prevent the coactive members from passing therethrough.

10. The apparatus according to claim 8, wherein a bed of coactive members is generally maintained on the grid, and means for recirculating the coactive members to a level above the bed, and causing the recirculated coactive members to cascade through the gas and onto the bed, the recirculating means including a rotary screw conveyor for lifting the recirculated coactive members above the bed.

11. The apparatus according to claim 8, wherein a drive shaft extends through the grid and is secured to the agitator to impart rotation thereto.

12. The apparatus according to claim 7, including a paddle agitator mounted for rotation coaxially about a vertical axis, the agitator having paddle means for agitating the coactive members, and means connected to the agitator and operable to rotate the agitator in a predetermined direction about said axis.

13. The apparatus according to claim 2, wherein the agitator is located at the bottom of the chamber.

14. The apparatus according to claim 2, wherein a bed of coactive members is generally maintained in motion by the agitator, and means for recirculating the coactive members to a level above the bed and causing the recirculated coactive members to cascade through the gas and onto the bed, the recirculating means including a rotary screw conveyor for lifting the recirculated coactive members above the bed.

15. The apparatus according to claim 2, including a drive shaft secured to the agitator to Impart rotation thereto.

16. The apparatus according to claim 15, wherein the drive shaft is hollow and projects above the bed, and means for recirculating the coactive members to a level above the bed and causing the recirculated coactive members to cascade through the gas and onto the bed, the recirculating means including an opening into the shaft at the bottom of the bed and a rotary screw conveyor extending coaxially through the hollow shaft for lifting the recirculated coactive members above the bed.

17. An apparatus for conducting a gas-liquid reaction on the surface of wetted particles and/or droplets contained in a gas flowing therethrough, comprising:

shell means having a gas inlet and a gas outlet and defining a chamber therebetween;

means for spraying a wetting liquid into the gas;

a dedicated surface for impingement of wetted particles and fluid droplets entrained in the gas, the dedicated surface being located in the gas path within the chamber;

at least a portion of the dedicated surface being pliable and located downstream of the fluid spraying means;

means for setting the pliable portion of the dedicated surface in motion for the removal of impinged particles therefrom, wherein the pliable portion of the dedicated surface is formed of a plurality of coactive members, and means for cascading the coactive members through the gas facing the gas outlet.

18. An apparatus for conducting a gas-liquid reaction on the surface of wetted particles and/or droplets contained in a gas flowing therethrough, comprising:

shell means having a gas inlet and a gas outlet and defining a chamber therebetween;

means for spraying a wetting liquid into the gas;

a dedicated surface for impingement of wetted particles and fluid droplets entrained in the gas, the dedicated surface being located in the gas path within the chamber;

at least a portion of the dedicated surface being pliable and located downstream of the fluid spraying means;

means for setting the pliable portion of the dedicate surface in motion for the removal of impinged particles therefrom; and including biasing means engaging the pliable portion of the dedicated surface to force a shape change in the pliable portion.

19. An apparatus for conducting a gas-liquid reaction on the surface of wetted particles and/or droplets contained in a gas flowing therethrough, comprising:

shell means having a gas inlet and a gas outlet and defining a chamber therebetween;

means for spraying a wetting liquid into the gas;

a dedicated surface for impingement of wetted particles and fluid droplets entrained in the gas, the dedicated surface being located in the gas path within the chamber;

at least a portion of the dedicated surface being pliable and located downstream of the fluid spraying means, wherein the pliable portion of the dedicated surface is in the form of a hollow frustum; and means for setting the pliable portion of the dedicated surface in motion for the removal of impinged particles therefrom.

20. The apparatus according to claim 19, including rotating biasing means engaging at least one of an outer surface and an inner surface of the pliable portion to force a continuing shape change.

21. The apparatus according to claim 20, wherein the biasing means includes a pair of diametrically opposed rollers.

22. The apparatus according to claim 20, including a drive shaft secured to the biasing means to impart rotation thereto.

23. The apparatus according to claim 22, wherein the drive shaft is hollow, and the fluid spraying means extends coaxially through the shaft and into the gas.

24. The apparatus according to claim 19, including a rotating paddle agitator positioned underneath the hollow frustum, and coactive members moved by the rotating paddle agitator.

25. The apparatus according to claim 24, wherein the coactive members are granular inert materials.

26. The apparatus according to claim 25, wherein the coactive members are ball-shaped metallic bodies.

27. The apparatus according to claim 3, wherein the agitator is located at the bottom of the chamber.

28. The apparatus according to claim 3, wherein a bed of coactive members is generally maintained in motion by the agitator, and means for recirculating the coactive members to a level above the bed and causing the recirculated coactive members to cascade through the gas and onto the bed, the recirculating means including a rotary screw conveyor for lifting the recirculated coactive members above the bed.

29. The apparatus according to claim 3, including a drive shaft secured to the agitator to impart rotation thereto.

30. The apparatus according to claim 29, wherein the drive shaft is hollow and projects above the bed, and means for recirculating the coactive members to a level above the bed and causing the recirculated coactive members to cascade through the gas and onto the bed, the recirculating means including an opening into the shaft at the bottom of the bed and a rotary screw conveyor extending coaxially through the hollow shaft for lifting the recirculated coactive members above the bed.

31. The apparatus according to claim 7, wherein the agitator is located at the bottom of the chamber.

32. The apparatus according to claim 7, wherein a bed of coactive members is generally maintained in motion by the agitator, and means for recirculating the coactive members to a level above the bed and causing the recirculated coactive members to cascade through the gas and onto the bed, the recirculating means including a rotary screw conveyor for lifting the recirculated coactive members above the bed.

33. The apparatus according to claim 7, including a drive shaft secured to the agitator to impart rotation thereto.

34. The apparatus according to claim 33, wherein the drive shaft is hollow and projects above the bed, and means for recirculating the coactive members to a level above the bed and causing the recirculated coactive members to cascade through the gas and onto the bed, the recirculating means including an opening into the shaft at the bottom of the bed and a rotary screw conveyor extending coaxially through the hollow shaft for lifting the recirculated coactive members above the bed.

35. The apparatus according to claim 17, wherein the coactive members are granular inert materials.

36. The apparatus according to claim 17, wherein the coactive members are ball-shaped metallic bodies.

37. The apparatus according to claims 17, 35, or 36, wherein the cascading means includes a chute located above the gas outlet.

38. The apparatus according to claims 17, 35, or 36, including a rotary screw conveyor for retrieving the cascaded coactive members.

39. The apparatus according to claim 38, including means for introducing a gaseous medium across the retrieved coactive members for sweeping dried particles therefrom.

40. The apparatus according to claim 39, including means for recirculating the swept coactive members to the chute.

41. The apparatus according to claim 40, wherein the recirculating means is a pneumatic conveyor.

* * * * *